US00RE46632E

(19) United States
(12) Reissued Patent
Saiz

(10) Patent Number: US RE46,632 E
(45) Date of Reissued Patent: Dec. 12, 2017

(54) DRILLING MUD CLOSED LOOP SYSTEM, METHOD, PROCESS AND APPARATUS FOR RECLAMATION OF DRILLING MUD

(71) Applicant: TERRA TERSUS LLC, Albuquerque, NM (US)

(72) Inventor: Gary Saiz, Bloomfield, NM (US)

(73) Assignee: Terra Tersus LLC, Albuquerque, NM (US)

(21) Appl. No.: 15/330,218

(22) Filed: Aug. 24, 2016

Related U.S. Patent Documents

Reissue of:
(64) Patent No.: 8,844,650
Issued: Sep. 30, 2014
Appl. No.: 12/657,989
Filed: Jan. 29, 2010

U.S. Applications:
(60) Provisional application No. 61/206,383, filed on Jan. 30, 2009.

(51) Int. Cl.
*E21B 21/06* (2006.01)
*E21B 21/01* (2006.01)

(52) U.S. Cl.
CPC ..... *E21B 21/06* (2013.01); *E21B 21/01* (2013.01)

(58) Field of Classification Search
CPC ..... E21B 21/06; E31B 21/01
USPC ..... 107/66, 206, 207
See application file for complete search history.

(56) References Cited

U.S. PATENT DOCUMENTS 2,576,283 A * 11/1951 Chaney ..... 175/66
3,777,405 A * 12/1973 Crawford ..... 34/591
4,116,288 A 9/1978 Love
4,192,392 A 3/1980 Messines
4,212,745 A * 7/1980 Jellesma ..... 210/401
4,586,825 A * 5/1986 Hayatdavoudi ..... 366/137
4,636,308 A 1/1987 Summers
4,639,258 A * 1/1987 Schellstede et al. ..... 92/260
4,670,139 A 6/1987 Spruiell et al.
4,725,362 A 2/1988 Dugat
4,750,920 A * 6/1988 Manuel et al. ..... 92/260
4,878,576 A * 11/1989 Dietzen ..... 198/494
5,093,008 A * 3/1992 Clifford, III ..... C02F 1/385 175/66

(Continued)

OTHER PUBLICATIONS

Dean E. Gaddy, "Yukos, Big E employ Near Closed-loop System" Oil & Gas journal/Sep. 4, 2000 pp. 40-41, 44-48.

(Continued)

*Primary Examiner* — Timothy J. Kugel

(57) ABSTRACT

The present invention is generally directed to a closed loop apparatus, system, process or method adapted for processing drilling mud used in a down hole well drilling process such that any undesirable particulate such as cuttings will be substantially, if not completely separated from the dirty mud while at the same time allowing the recycled drilling mud to be continuously circulated with the drilling mud. In one embodiment, the present invention includes the following components, all in fluid or mud flow communication with one another and with an adjacent drilling rig: at least one clean mud mixing tank, at least one pump system, at least one dirty mud shakers, at least one optional conveyor belt system, at least one recycled mud reclamation tank and one or more filtering centrifugal pumps or centrifuge systems.

56 Claims, 2 Drawing Sheets

(56) References Cited

U.S. PATENT DOCUMENTS

| | | | | |
|---|---|---|---|---|
| 5,454,957 | A * | 10/1995 | Roff, Jr. | B01D 37/00 134/25.1 |
| 5,570,749 | A | 11/1996 | Reed | |
| 5,814,230 | A | 9/1998 | Willis et al. | |
| 5,882,524 | A * | 3/1999 | Storey et al. | 210/712 |
| 5,971,084 | A | 10/1999 | Dietzen | |
| 5,996,484 | A * | 12/1999 | Reddoch | 100/37 |
| 6,106,733 | A | 8/2000 | Wood | |
| 6,193,070 | B1 * | 2/2001 | Rowney et al. | 209/5 |
| 6,213,227 | B1 | 4/2001 | Dietzen | |
| 6,530,438 | B1 * | 3/2003 | McIntyre | 175/66 |
| 6,607,659 | B2 | 8/2003 | Hensley et al. | |
| 6,823,238 | B1 | 11/2004 | Hensley | |
| 6,932,169 | B2 | 8/2005 | Wylie | |
| 7,144,516 | B2 * | 12/2006 | Smith | 210/803 |
| 7,195,084 | B2 | 3/2007 | Burnett et al. | |
| 7,568,535 | B2 * | 8/2009 | Larson et al. | E21B 21/063 166/75.12 |
| 8,132,632 | B2 * | 3/2012 | Scott | 175/66 |
| 2001/0039887 | A1 * | 11/2001 | Reddoch | 100/117 |
| 2002/0074269 | A1 | 6/2002 | Hensley et al. | |
| 2004/0016572 | A1 | 1/2004 | Wylie et al. | |
| 2004/0069536 | A1 * | 4/2004 | Cowan | E21B 21/066 175/66 |
| 2005/0023040 | A1 * | 2/2005 | Cabelka | 175/207 |
| 2007/0084638 | A1 | 4/2007 | Bohnsack et al. | |
| 2007/0278012 | A1 * | 12/2007 | Smith | E21B 21/065 175/66 |
| 2008/0083566 | A1 | 4/2008 | Burnett | |
| 2008/0277165 | A1 | 11/2008 | Nahmad | |
| 2008/0283301 | A1 | 11/2008 | Sherwood et al. | |

OTHER PUBLICATIONS

Dorsey Rogers and Dee Smith, Gary Fout and Will Marchbanks "Closed Loop Drilling System: A Viable Alernative to Reserve Waste Pits" World Oil Reprint, Dec. 2006, vol. 227 N.

"This is Swaco" Swaco Brochure, published 1998.

Lance Astrella and Reginald Wiemers "Technology Closed loop drilling systems can eliminae reserve pit costs" Oil and Gas journal, published May 27, 1996.

Earthworks/Alternative to Pits (www.earthworks.org) Case Studies.

U.S. Patent Application Publication US 2009/0020336 A1, Published Jan. 22, 2009, Inventor: Bohnsack et al.

* cited by examiner

DRILLING MUD CLOSED LOOP SYSTEM, METHOD, PROCESS AND APPARATUS FOR RECLAMATION OF DRILLING MUD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

The present invention claims the benefit and priority of U.S. Provisional Patent Application No. 61/206,383 filed on Jan. 30, 2009.

FIELD OF INVENTION

The present invention is generally directed to a closed loop apparatus, system, process or method adapted for processing and reclaiming drilling mud used in a down hole well drilling process or fracturing ("frac") job.

BACKGROUND OF THE INVENTION

When rotary drilling deep wells into the Earth (such as the drilling of oil wells, gas wells and similar boreholes), a wide variety of geographic formations will be encountered at various depth levels. During a typical drill procedure, a substantial amount of drilling mud must first be premixed in a large tank or vessel known as a mud pit. Generally, heavy bags of dry mud (about 50 pounds each) are injected into a mixing tank through a hopper, and the dry mud is mixed with water and other desired compounds in the hopper and transported into the tank. Mud is a substance which is premixed from a bag with one or more liquids (usually water, and sometimes other caustic materials) prior to injection into the hole. The other desired compounds are preselected based on the drilling requirements, and may include, for example, chemicals, liquid and/or gas. The mud is premixed typically so that it is heavier than water in order to pick up the cuttings. A exemplary weight of the mud is between 11 and 12 pounds of mud per gallon, and usually is dependent on the job site characteristics and requirements.

A representative mud pit may be a 10 feet by 30 feet and about 12 feet high, which holds about 400 barrels (bbl) of mud. The mud pit is usually connected to the drilling rig by way of a mud line and mud pump which injects the mud into the top of the drill pipe. In some typical drilling procedures, over 1200 bags of mud may be used on site. To create mud for a 3000 foot well, for example, and at $50 per bag of mud, it may cost between $75,000 and $100,000 to create the mud on site. Thus, the requirement of transporting and using mud at a drilling site can be a significant expense.

As partially illustrated in FIG. 1, drilling rigs usually employ a derrick that extends above the well drilling platform and is constructed so that it can support joints of drill pipe connected end-to-end during the drilling operation. As the drill bit is forced into the Earth's subsurface, additional pipe joints are added to the connection (or, "string") of drill pipes. The drill string pipes each have an internal longitudinal bore for carrying drilling mud from the well drilling platform to a drill bit supported at the lower or distal end of the drill string. The derrick may be set up adjacent to the borehole to begin the drilling process. A typical drilling rig may use a 14 inch drilling bit to begin the drilling process. A typical drilling bit contains holes (e.g., openings or apertures) on its drilling portion, which are in fluid or mud flow communication with the mud through tubing connected to the mud pit. In this regard, as the drilling procedure commences and continues to drill down into the hole, premixed clean mud can be injected to the borehole concurrently, and hence, into the hole, through the drill bit. Because the entire hole is securely pressurized (as is common in conventional down hole drilling procedures), the drilling mud that is injected into the hole is subsequently forced to return to the Earth surface. However, during the drilling process, the Earthen soil, which is excavated through the drilling process, also contains one or more particles or heavier particulates which get caught in the drilling mud and begin to follow the drilling mud flow pattern. As a consequence, as the drilling mud returns to the surface, so does the particles and particulates. These particles or particulates are referred to in the industry as "cuttings" (e.g., the particles that are cut away from the Earth to create the hole). Representative cuttings may include granite, rock, coal, sand, shale, water, gas and like geographic minerals found in the Earthen crust (including, for example, potentially environmentally hazardous materials such as oil). In some instances, the cuttings attach or adhere themselves to the drilling mud.

The use of mud also means that several characteristics of the drilling process must be maintained, so that (for example) the mud's viscosity, density, and other properties must be maintained to predetermined limits, otherwise there is a significant risk that the drilling process may be adversely affected. Nevertheless, drilling mud is useful, as it lubricates the drill bit during the drilling process while allowing for the each transportation of cuttings. The drilling mud is typically mixed to be a heavy viscous liquid, and other compounds (such as, for example, diesel, crude oil, and other non-water soluble petroleum based products) may be added to the mud to facilitate the mud's lubricating characteristics.

Depending on the project, a typical drilling may go anywhere from 25 feet below the Earth's surface to well over 20,000 feet below the Earth's surface. Every drilling project is unique, and may require different parameters for use. Thus, for example, a short range depth hole may only require a small diameter hole to be dug, whereas a long range depth hole may require a much larger diameter hole to be dug. Thus, for example, a 7000 foot deep hole may typically require the creation of an approximately 18 inch diameter surface casing substantially throughout the length of the hole being dug. As the hole is being slowly dug, the drilling bit is removed from the hole, and surface casing is inserted into the diameter of the hole in order to create a reinforcement wall or barrier which also prevents any external material (such as gas or oil) from coming to the surface during the pressurized drilling process. Surface casing pipe is typically formed of a metal or metal compound and usually comes in 20 to 30 foot lengths which can be interconnectable to allow longer length casings (as may be needed for longer depth holes). The diameter of the hole being dug is generally larger than the surface casing inserted into the hole. Once the casing is installed, cement is then inserted into the outer portion of the casing surface, thereby creating a permanent down hole bore. To help the cement cure, calcium chloride may be added to the cement. Calcium chloride in the cement also helps the cement to dry in adjacent water pockets underneath the Earth's surface. By cementing the casing to the Earth, a barrier is created which prevents any liquid, gas or other undesirably contaminants nearby from escaping to the Earth's surface during the drilling process.

The process of drilling a long-range down hole well is repetitive and done in sections. Thus, for example, the first 1000 feet is drilled and then sealed through the casing/cement structure. Then, the next 1000 feet is drilled and sealed through the casing/cement structure. This repetition continues until the desired depth of the hole is reached. During this entire process, drilling mud is continuously injected into the hole through the drill bit. Because the system is pressurized, the used drilling mud as well as any cuttings are forced to return to the Earth surface (hereafter collectively referred to as "dirty mud").

When the dirty mud returns to the surface, the dirty mud may thereafter be transported to a conventional prior art shaker or shaker system containing a plurality of screens. The shaker system is utilized to try to separate some of the mud from the cuttings. Namely, the shaker attempts to separate the used mud from the larger cuttings so that some of the mud may fall through the screens and into the clean mud tank. The larger cuttings and clumped or adhered mud may then continue on to be transported to a large container for disposal to a land farm or alternatively, be transported to an empty Earth pit (or, reserve pit, as they are sometimes called) which has already been dug on site. The empty Earth pit may have, for example, the dimensions of 50 feet by 120 feet by 12 feet deep, and the Earthen dirt which was dug up to create the empty Earth pit is usually displaced off to the side of the empty Earth pit in a mound. These type of Earth pits may contain a variety of elements, including drilling mud, cuttings and other solid wastes. Unfortunately, there are numerous documented events where these pits have failed to contain the waste, which results in the contamination of the local environment and/or water aquifers. As a result, and due to the change in many recent laws, the used mud which will be placed in the empty Earth pit must subsequently be removed and transported to a recycling land farm, and the Earthen dirt which was dug up to create the empty Earth pit must thereafter be replaced back into the empty pit. A land farm is an offsite area which is used to mix the dirty mud with one or more chemicals or manure (such as chicken manure or sheep manure, for example), which heats up the dirty mud through a chemical decomposition process in an attempt to evaporatively cleanse the chemicals from the dirty mud. Such land farms are usually far away from the drilling site, and require heavy equipment used to till and rotor the dirty mud with the manure in order for the chemical decomposition process to continue. At some point in the future (generally, on the order of years), the dirty mud can then be cleared for reintegration back into the Earth's soil. This process leads to environmental pollution. Moreover, the cost for transporting the dirty mud to an offsite land farm is very expensive (a 3000 foot well in La Plata County, Colorado recently cost almost $300,000 to transport the dirty mud to an offsite land farm). Additionally, third party companies must be hired to further clean the dirty mud, and also certify that the area where the drilling occurred is environmentally safe after the drilling process.

Another type of land farm occurs where the dirty mud is transported to an offsite area and injected deep into the Earth through a borehole well for permanent storage. The well stays open until it is full of dirty mud, and then the well is permanently closed. Again, this type of dirty mud storage may also cause environmental pollution in the Earth soil.

Conventional drilling processes have many disadvantages. For example, there is a significant cost for environmental remediation which is legally required by state and federal agencies. Additionally, there is still a significant possibility of environmental pollution if the drilling process is done incorrectly or with disregard to the local environment. Moreover, allowing the cuttings to remain in the mud during the drilling process is problematic because the particulates will likely have an adverse impact on the drilling mud (and hence, the drilling operation). Finally, the cost for remediation can range from $50,000 to $250,000 or more (protecting the area from local wildlife through fences, nets, tarps and like instruments, etc).

It is therefore an exemplary feature of the present invention to provide a novel method, system or apparatus for processing drilling mud in a closed loop such that any undesirable particulate such as drill cuttings may be substantially, if not completely, separated from the drilling mud while at the same time allowing the recycled drilling mud to be continuously circulated with any drilling mud.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

The present invention is generally directed to a closed loop apparatus, system, process or method adapted for processing drilling mud used in a down hole well drilling process such that any undesirable particulate such as cuttings may be substantially, if not completely, separated from the dirty mud while at the same time allowing the recycled drilling mud to be continuously circulated with the drilling mud. In one embodiment, the present invention includes the following components, all in fluid or mud flow communication: at least one clean mud mixing tank, at least one pump, at least one or more dirty mud shakers, at least one conveyor belt system, at least one recycled mud reclamation tank and one or more filtering centrifugal pumps or centrifuges. As used in this invention, the term "closed loop" is to be broadly defined, and may include a system where a measured output value of the drilling mud is compared to a desired input value of the drilling mud and corrected accordingly (either manually or through computer control, for example). This definition also broadly includes the disclosure of a cyclical material flow adapted to minimize waste (so that the drilling mud may be re-used as desired).

This disclosure describes numerous specific details that include specific structures and elements, their particular arrangement, and their particular functions in order to provide a thorough understanding of the present invention. One skilled in the art will appreciate that one may practice the present invention without the specific details.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

The present invention is a closed loop apparatus, system or method which is adapted for processing drilling mud used in a down hole well drilling process with a drilling rig such that any undesirable particulate such as cuttings may be substantially, if not completely, separated from the dirty mud while at the same time allowing the recycled drilling mud to be continuously circulated with any clean drilling mud.

Figure 1:
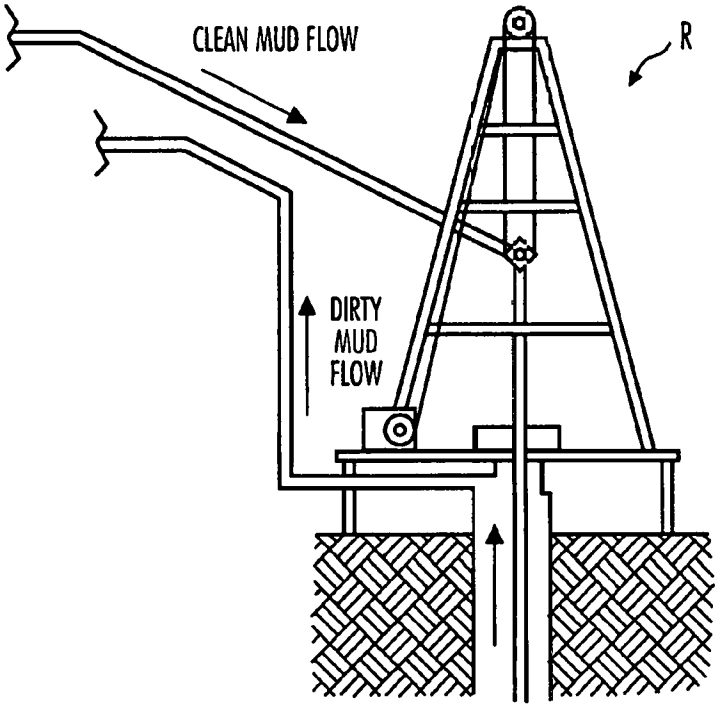
FIG. 1 illustrates an exemplary drilling rig R performing a down hole drilling project.

An exemplary drilling rig R is illustrated in FIG. 1, and generally depicts a drilling bit in mud flow communication with the clean mud tank 103 through a mud line and clean mud pump $P_3$. The illustration also identifies a dirty mud flow return line, which is in mud flow communication with the shaker system 101.

Figure 2:
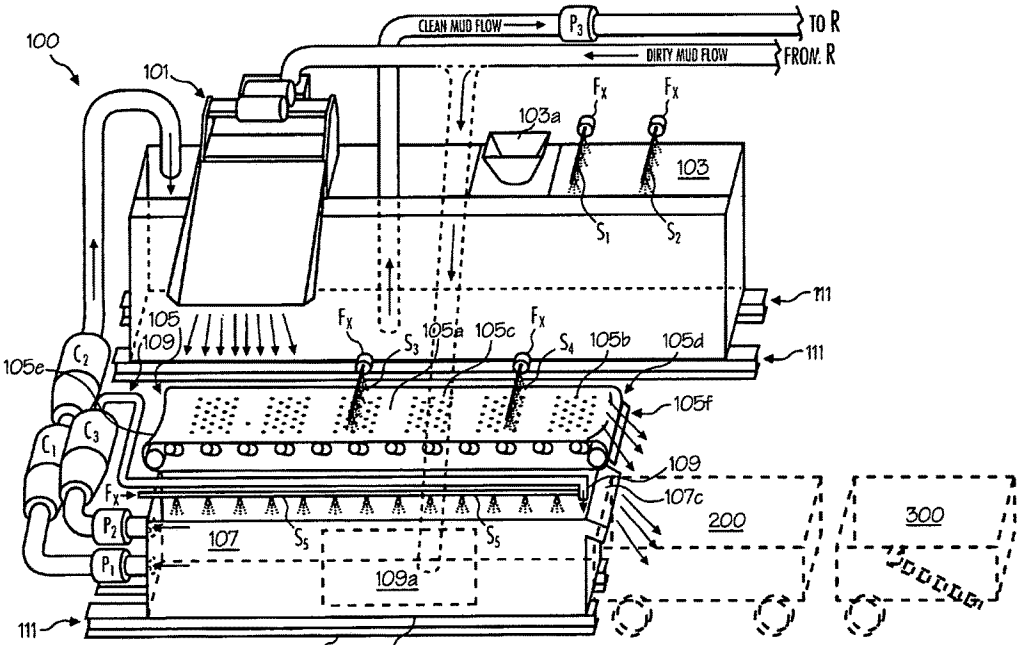
FIG. 2 illustrates an exemplary representation of the elements comprising the present invention, all elements being in mud flow communication with rig R illustrated in FIG. 1.

Turning now to FIG. 2, the present invention (in one embodiment as an apparatus) comprises at least one open air clean mud mixing tank 103, one or more pump systems $P_x$ (where x=1, 2, 3, . . . etc.), one or more optional dirty mud shakers or shaker systems 101, at least one optional conveyor belt system 105, at least one open air recycled mud reclamation tank 107, and one or more centrifugal pumps or centrifuges $C_x$ (where x=1, 2, 3, . . . etc.), with all elements being in fluid or mud flow communication with one another, and with the drilling rig R. Additional optional elements are also contemplated, as disclosed and discussed throughout this invention.

As those of skill in the art will now recognize, the travel path of the mud (whether clean, dirty or as processed as variously disclosed in accordance with the present invention) from the drilling rig R through the disclosed invention and back to the drilling rig is defined as a closed loop mud flow communication path, and collectively, all mud travel paths form the mud flow communication occurring between the various elements disclosed in this invention.

As an exemplary operational process or method, clean mud is added with water to a conventional hopper 103a for mixing and storage in clean mud mixing tank 103. Thereafter, the clean mud in clean mud mixing tank 103 is pumped to the rig R via exemplary pump P3. The dirty mud thereafter comes up from the Earth through the rig R a period of time after the drilling process commences. The dirty mud may then optionally be transported via a bluey line to one or more dirty mud shakers 101 (a bluey line is commonly known as being the pressurized tubing or transport system connected to the return of the drilling rig which bleeds pressure at the surface of the wellhead in order to, among other things, protect the crew and rig and move the dirty mud away from the drilling area). The primary purpose of each dirty mud shaker 101 is to separate some of the mud from the larger cuttings through the use of vibrational forces from each shaker, resulting in shaker processed mud and used mud. If some of the used mud is separated from the cuttings, conventionally, the used mud may fall through the shaker and back into the clean mud tank 103 for remixing with the clean mud. A representative clean mud mixing tank 103 may be a 400 bbl tank or vessel. An exemplary compact shaker unit which may be used according to the present invention is the Meerkat PT Shale Shaker offered by Mi SWACO of Houston, Tex. While conventional shakers are currently used in this fashion, only a very small amount of mud (typically less than 20 percent) from the shaking process is reclaimed (e.g., the used mud falls through the shaker 101 and into tank 103) or remixed with the clean mud. Indeed, shaker manufacturers acknowledge that the shakers exhibit very low separation efficiency. As a consequence, a large majority of shaker processed mud continues to remain adhered to the cuttings during this process. Currently, typical conventional processes do not focus on the ability or need to further separate the shaker processed mud from the cuttings, and instead, the shaker processed mud still containing a large portion of mud is merely transported to an adjacent Earthen pit or a land farm as described previously. The present invention recognizes and solves the problem for a need for further separation processing of the shaker processed mud even after shakers are used.

The shaker processed mud (whether separated or not) may then be optionally transported from shaker system 101 to at least one conveyor belt system 105 via an optional transport chute or slide as seen in FIG. 2. Alternatively, the dirty mud arising from the drilling rig R may then be immediately transported to (or, received by) the at least one conveyor belt system 105 thereby bypassing the shaker procedure (thus, resulting in mud arising from the mud flow communication path). Conveyor belt system 105 is adapted to substantially separate undesired particles from the shaker processed mud or the dirty mud resulting in recycled mud and cuttings. A preferred conveyor belt system 105 includes a belt 105a having one or more holes or openings 105b variously dispersed upon or through the conveyor belt 105a, which allows the substantially separated recycled mud to fall through the conveyors belt holes 105b and into recycled mud tank 107. Representative hole 105b sizes which may be formed on the belt 105a may be about ¼ inch in diameter, for example. A concave shaped belt 105c may be preferred because in field tests, the concave shaped belt 105c allowed the shaker processed mud or the dirty mud to congregate towards the middle of the belt during the separation process. Of course, additional conveyor belt systems can be used together, and may be especially useful in those drilling jobs that does not have a great deal of land for equipment placement.

As seen in FIG. 2, at least a first spray system $S_x$ (where x=1, 2, 3, . . . etc.) may be optionally introduced, controlled or utilized variously throughout the present invention to selectively spray water, chemicals, gas, air or other combined liquids and/or gases (collectively referred to as "fluid") on the shaker processed mud or the dirty mud as it travels on the conveyor belt system 105 in order to further assist the separation of mud from the cuttings. As a result, each spray system $S_x$ may be in fluid communication with one or more fluid reservoirs or containers $F_x$ (where x=1, 2, 3, . . . etc.) which are adapted to store and deliver fluid to the spray systems $S_x$ for dispensing as desired. As depicted in FIG. 2, an exemplary spray system $S_3$, $S_4$ is depicted above and adjacent to the conveyor belt system 105, each system adapted to spray fluid on the shaker processed mud or the dirty mud as it travels on the conveyor belt system 105 in order to further assist the separation of mud from the cuttings. Of course, each individual spray system may be adapted to selectively disperse separate types of fluid (e.g., one spray system may dispense water, another spray system may dispense a chemical compound, etc).

The spray systems $S_x$ may also be adapted to selectively dispense fluid which neutralizes or eliminates an undesirable compound or compounds in the mud. Thus, for example, a liquid agent such as Dawn brand of detergent may be used with the fluid system $S_x$ in order to separate out any oil which may be combined with the dirty cuttings. In some situations, the fluid used in any of the fluid systems $S_x$ may be heated or heatable, which may result in drier cuttings for disposal (which has the advantage of not weighing as much, for example, because the moisture content is substantially removed and thus the cost for cuttings disposal may be decreased).

As the shaker processed mud or the mud from the mud flow communication path is separated from the cuttings, the recycled mud may then travel through or into the belt's holes 105b and thereafter fall into the mud reclamation tank 107. Concurrently, the cuttings continue to travel on the conveyor belt system 105 (and perhaps, for example, through one or more pressure spray systems $S_4$ for additional treatment) until the cuttings (or, remaining conveyor processed mud) can be transported to at least one cuttings disposal tank 200 or area for further processing. In one contemplated composition, the conveyor belt 105a is made from an approximately 150-200 mesh screen adapted for use in a conveyor system.

Optionally, the conveyor belt system has a return end 105e and at the opposite end, a departure end 105d. Adjacent to but underneath the departure end 105d is found a scraper means or flap 105f optionally secured to the conveyor belt system 105, which is adapted to scrape any further dirty mud, cuttings or mud from the conveyor belt as it travels back to the return end 105e.

Of course, those of skill in the art will realize that the contemplated conveyor belt system 105 may also function vibrationally at any point or points along the conveyor travel path of the belt 105a to further assist separating mud from the cuttings subjected to such vibrational forces.

In another embodiment, the recycled mud reclamation tank 107 is adapted to store recycled mud, and transport the recycled mud back to the drilling rig R. Recycled mud tank 107 is preferably adapted to receive mud from the mud flow communication path, so that the mud may arrive from either the shaker processed mud from the shaker system 101, or may be mud arriving from the conveyor belt system 105. Preferably, the recycled mud reclamation tank 107 may be a barrel tank which is in fluid or mud flow communication with at least one pump P1 at a transmitting end 107a. On the opposite end 107b of the tank is optionally positioned a disposal removing end 107c which is adapted to allow the recycled mud within tank 107 to be removed from the tank 107 (such as to, for example, a disposal truck or vessel 200 as seen in FIG. 2).

If the recycled mud sits unattended for an extended period of time in the recycled mud reclamation tank 107, the heavier portion of the recycled mud will likely separate from the water liquid, so that the water will sit upon the mud. And, similarly, if the recycled mud sits unattended for an extended period of time, the heavier portion of the recycled mud may not only separate from the water liquid, any oil or lighter liquid present may also separate from the water so that the oil or lighter liquid sits upon the water. As a consequence, it may then be possible to further continuously cleanse the recycled mud residing in the recycled mud reclamation tank 107 of any undesired contaminant such as oil or lighter liquid.

Thus, in another embodiment of the present invention, the recycled mud reclamation tank 107 may also be in fluid or mud flow communication with at least one recirculation system 109 or 109a. Preferably, the recirculation system 109 or 109a is utilized or otherwise adapted to further filtrate or cleanse the recycled mud within the recycled mud reclamation tank (either internally, or, as the recycled mud is transported to the clean mud mixing tank). In one embodiment, the recirculation system 109 or 109a includes at least one centrifuge C3 and at least an optional second spray system (identified as S5 in FIG. 2). In order to further cleanse the recycled mud in the recycled mud reclamation tank 107, it might be desirable to cease transportation of the recycled mud to centrifuge C3, and allow the recycled mud to sit unattended or undisturbed for a predetermined period of time in the recycled mud reclamation tank 107 to allow the mud to separate from any undesired contaminant. Then, the process of continuously recirculating the mud in tank 107 via recirculation system 109 or 109a is applied while concurrently applying pre-selected spray through the second spray system S5. In preferred operation, the centrifuge C3 may then be adapted to filter out any undesirable compound or compounds (such as oil, for example), and return the recycled mud to the tank 107. When this process is completed, the process of transporting the recycled mud to centrifuge system (identified, for example, as C1-C3 in FIG. 2) can continue. Of course, those of skill in the art will realize that the transportation process to centrifuge system C1-C3 and the recirculation system 109 or 109a can both be used approximately at the same time, if desired, either individually, or in combination with other spray systems. Additionally, the tank 107 may have a plurality of compartments (not shown, but known to those of skill in the art), with each compartment in communication with separate exemplary recirculating systems (not shown), so that each compartment may have "cleaner" recycled mud than the compartment before, so that the recycled mud can be further cleansed or filtered.

In one embodiment, all of the disclosed components may be assembled as a complete system, with (for example) the shaker 101 sitting above and on the clean mud mixing tank 103, and the conveyor system 105 sitting above or on the recycled mud reclamation tank 107, with the centrifuge systems $C_x$ and the spray systems $S_x$ placed as desired. Preferably, the complete system 100 is adapted to sit upon a foundation (such as the I-beam system 111 utilized and illustrated in FIG. 2, or an exemplary skid system, for example). The foundation 111 should preferably be able to carry the weight of all components when picked up by a crane or like device. Similarly, the foundation 111 should preferably be able to retain all of the components for transportation between drilling job sites.

One or more centrifuge systems $C_x$ are disclosed. Each centrifuge $C_x$ preferably operates at significantly high gravity forces ("G" forces) and are preferably adapted to further selectively filtrate or cleanse an undesired compound or compounds. Exemplary undesirable compounds may include sand, oil, shale, smaller cuttings or even much smaller particles. An exemplary centrifuge unit which may be used according to the present invention is Model Nos. 414 Centrifuge or 518 Centrifuge offered by Mi SWACO of Houston, Tex., which can operate at up to 2,100 G.

While not disclosed in the attached Figures, those of skill in the art will also recognize that the entire process or method can be computer controlled by utilizing at least one centralized computer system. Namely, each individual component disclosed is contemplated to be in selective electronic control communication with one another so that the operation of any of the components (if needed) may be entirely computer controlled through a centralized computer system. Moreover, while not disclosed in the attached Figures, on site power generators are used to provide power to the various components. It is contemplated that one or more of the following components may also be included within the disclosed apparatus, method or system: power generators for providing power to those disclosed components of the present invention requiring power; liquid treatment systems for treating any liquids as desired; heating mechanisms for heating any elements or fluids as desired; and/or air or gas pressure systems to provide any form of air or gas as may be required.

The present invention has the advantage of using recycled mud during the drilling process, which leads to substantially reduced costs associated with using new mud, and constantly mixing the new mud with water or like liquid used in a drilling process (including gels, cross linked agents and cross linkable agents). Additionally, the amount of mud required is substantially reduced. Moreover, the present invention allows the recycled mud to be used from one job site to another job site, without the need for transportation to a land farm. Additionally, the present invention has the significant advantage of being able to leave the recycled mud and/or cuttings on site (for example, in a holding tank), which may allow a third party to visit the site and mix the mud with chemicals or manure (such as chicken manure or sheep manure, for example to evaporatively cleanse the chemicals from the dirty mud. This advantage saves the time and cost for transporting the mud to an offsite farm, and allows the land owner to retain the mud on his or her land.

During most drilling projects, large fracturing tanks (or, "frac tanks" 300, shown in FIG. 2) are brought to the drill site. The frac tanks normally store and dispense liquid (such as water) as may be required on the job site. A typical frac tank can hold about 200 bbl of liquid. The frac tanks are typically fully emptied before they are transported to the next job site. After the drilling process is finished, a "reverse out" is performed, wherein the drilling process is reversed and the drilling bit will slowly return to the Earth surface. During this process, the present invention contemplates injecting water into the well during the reverse out in order to completely remove the mud injected into the well for recycling as disclosed herein. Moreover, after the down hole well drilling process is completed, the present invention contemplates transporting the recycled mud which may remain in either the clean mud tank 103 or the recycled mud tank 107 to one or more of the frac tanks for transportation to the next job site and dispensing at the next job site. By utilizing frac tanks with the components of this invention in this embodiment, the components of the assembled system can be cleaned, and easily transported without the weight of any excess mud. Concurrently, the mud may be stored in the frac tanks until transported to the next job site.

Those of skill in the art will soon realize the numerous advantages found when utilizing the present invention. For example, the present invention results in a significant cost savings for drilling procedures. The present invention further results in improved environmental impact, and further, results in using a significantly reduced amount of mud for drilling procedures. Moreover, the present invention provides a novel process or system for processing drilling mud, but continuously and automatically separating undesired elements (e.g., cuttings) from the drilling mud while approximately simultaneously reintroducing the recycled drilling mud back into the drilling process. The present invention also has the advantage of a closed loop reclamation system which is adapted to substantially prevent the depletion of drilling mud, thereby resulting in a lower cost drilling operation.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principle is followed.

I claim:

1. A closed loop apparatus for reclaiming drilling mud used in a down hole well drilling process with a drilling rig, the apparatus comprising at least one clean mud mixing tank adapted to mix and store clean mud, the clean mud mixing tank being in mud flow communication with the drilling rig through a predefined mud flow communication path, at least one conveyor belt system in mud flow communication with the drilling rig, at least one recycled mud reclamation tank in mud flow communication with the conveyor belt system, one or more pump systems in mud flow communication with the drilling rig and the recycled mud reclamation tank, and one or more centrifuges in mud flow communication with the recycled mud reclamation tank and the clean mud mixing tank, the apparatus adapted to continuously circulate the drilling mud to and from the drilling rig while substantially removing one or more cuttings excavated during the drilling process, the apparatus further comprising one or more dirty mud shakers, each dirty mud shaker adapted to receive dirty mud from the drilling rig and being in mud flow communication with the clean mud mixing tank and the conveyor belt system, each shaker further adapted to partially separate undesired particles from the dirty mud resulting in shaker processed mud and used mud, each shaker further adapted to transport the used mud to the clean mud mixing tank and reintroduce the shaker processed mud back into the mud flow communication path.

2. The apparatus of claim 1 wherein the conveyor belt system is a conveyor belt adapted to receive mud from the mud flow communication path and substantially separate undesired particles from the mud resulting in recycled mud and cuttings, each [convey] *conveyor* belt system further adapted to transport the recycled mud to the recycled mud reclamation tank and transport any remaining cuttings to at least one cuttings disposal tank.

3. The apparatus of claim 2 further including at least a first pressure spray system adapted to selectively dispense fluid which neutralizes or eliminates an undesirable compound in the mud.

4. The apparatus of claim 2 wherein the conveyor belt is vibrational at one or more points along the conveyor travel path.

5. The apparatus of claim [2] *3* wherein the recycled mud reclamation tank is adapted to store recycled mud from the conveyor belt system and allow the recycled mud to be removed from within the tank to a disposal vessel.

6. The apparatus of claim 5 further including at least one recirculation system in mud flow communication with the recycled mud reclamation tank, each recirculation system adapted to [further] filtrate the recycled mud within the recycled mud reclamation tank.

7. The apparatus of claim 6, each recirculation system comprising at least one centrifuge system adapted to filter out one or more undesirable compounds in the recycled mud and [returning] *return* the recycled mud to the recycled mud reclamation tank.

8. The apparatus of claim 7, each recirculation system further comprising at least a second spray system adapted to selectively dispense fluid adapted to neutralize or eliminate an undesirable compound in the recycled mud.

9. The apparatus of claim 2 wherein the recycled mud reclamation tank is further adapted to transport the recycled mud back to the drilling rig through at least one centrifuge system in mud flow communication with the recycled mud reclamation tank, each centrifuge system being adapted to selectively filtrate one or more undesired compounds prior to transmitting the recycled mud to the drilling rig.

10. The apparatus of claim 1 further including at least a first pressure spray system adapted to selectively spray fluid on the shaker processed mud as it travels on the conveyor belt system in order to further assist the separation of mud from the cuttings.

11. The apparatus of claim [1] *6* further comprising at least one centralized computer system in electronic communication with the clean mud mixing tank, the conveyor belt system, the recycled mud reclamation tank, and the recirculation system, the computer system adapted to selectively control the operation of any of the clean mud mixing tank, the conveyor belt system, the recycled mud reclamation tank, or the recirculation system.

12. The apparatus of claim [1] *6* further comprising a foundation adapted to retain and, during transport, carry the weight of the clean mud mixing tank, the conveyor belt system, the recycled mud reclamation tank, and the recirculation system.

13. The apparatus of claim 1 further comprising at least one frac tank, each frac tank adapted to receive, store, and dispense recycled mud which may remain in either the clean mud tank or the recycled mud tank after the down hole well drilling process is completed.

14. A system for reclaiming drilling mud used in a down hole well drilling process with a drilling rig having a mud flow communication path containing drilling mud, the system comprising at least one clean mud mixing tank adapted to mix and store clean mud, at least one conveyor belt system adapted to receive mud from the mud flow communication path and substantially separate undesired particles from the mud in the mud flow communication path resulting in recycled mud and cuttings, at least one recycled mud reclamation tank adapted to store recycled mud from the conveyor belt system, one or more pump systems adapted to selectively assist mud flow travel within the mud flow communication path and one or more centrifuge systems adapted to selectively filtrate one or more undesirable compounds in the drilling mud, each clean mud mixing tank, conveyor belt system, recycled mud reclamation tank, pump system and centrifuge system all being in mud flow communication with the drilling rig through the mud flow communication path, the system adapted to continuously circulate the drilling mud to and from the drilling rig while substantially removing one or more cuttings from the drilling mud excavated during the drilling process.

15. The system of claim 14 further comprising at least one dirty mud shaker adapted to receive drilling mud from the drilling rig to partially separate undesired particles from the mud resulting in shaker processed mud and used mud, each shaker further adapted to transport the used mud to the clean mud mixing tank and reintroduce the shaker processed mud back into the mud flow communication path.

16. The system of claim 14 wherein the conveyor belt system is a conveyor belt adapted to transport the recycled mud to the recycled mud tank and transport any remaining cuttings to at least one cuttings disposal tank.

17. The system of claim 16 further including at least a first pressure spray system adapted to selectively spray fluid on the mud as it travels on the conveyor belt system in order to further assist the separation of mud from the cuttings, the first pressure spray system further being adapted to selectively dispense fluid which neutralizes or eliminates an undesirable compound in the mud.

18. The system of claim 17 further including at least one recirculation system in mud flow communication with the recycled mud reclamation tank, each recirculation system adapted to filtrate the recycled mud within the recycled mud reclamation tank.

19. The system of claim 17, each recirculation system further comprising at least one centrifuge adapted to filter out one or more undesirable compounds in the recycled mud and returning the recycled mud to the recycled mud reclamation tank, each recirculation system further comprising at least a second spray system adapted to selectively dispense fluid adapted to neutralize or eliminate an undesirable compound in the recycled mud.

20. The system of claim 14 wherein the recycled mud reclamation tank is further adapted to transport the recycled mud back to the drilling rig through at least one centrifuge system and at least one pump in mud flow communication with each centrifuge system, each centrifuge system being adapted to selectively filtrate one or more undesired compounds prior to transmitting the recycled mud to the clean mud mixing tank.

21. A closed loop method for reclaiming drilling mud used in a down hole well drilling process with a drilling rig having a mud flow communication path containing drilling mud from a clean mud mixing tank, the method comprising the steps of:

transporting the drilling mud from the drilling rig to at least one dirty mud shaker, each dirty mud shaker adapted to receive dirty mud from the mud flow communication path, each shaker further adapted to partially separate undesired particles from the drilling mud resulting in shaker processed mud and used mud, each shaker further adapted to transport the used mud to [at least one] *the* clean mud mixing tank and [reintroducing] *reintroduce* the shaker processed mud back into the mud flow communication path;

transporting the shaker processed mud from the mud flow communication path to at least one conveyor belt system, each conveyor belt system being adapted to substantially separate undesired particles from the shaker processed mud resulting in recycled mud and cuttings, each conveyor belt system further adapted to transport the recycled mud to [at least one] *the* recycled mud tank and transport any remaining cuttings to at least one cuttings disposal tank;

transporting the recycled mud within the recycled mud tank to the clean mud mixing tank for use as drilling mud through one or more centrifuge systems, each centrifuge system adapted to selectively filtrate one or more undesired compounds prior to transmitting the recycled mud to the clean mud mixing tank.

22. The method of claim 21 further including the step of introducing at least a one first pressure spray system to the at least one conveyor belt system, the at least one first pressure spray system adapted to selectively spray fluid on the mud as it travels on the conveyor belt system in order to further assist the separation of mud from the cuttings, the at least one first pressure spray system further being adapted to selectively dispense fluid which neutralizes or eliminates an undesirable compound in the mud.

23. The method of claim 22 further controlling the at least one first pressure spray system to selectively dispense fluid which neutralizes or eliminates an undesirable compound in the mud.

24. The method of claim 21 further including the steps of utilizing at least one recirculation system in mud flow communication with the recycled mud reclamation tank, each recirculation system adapted to filtrate the recycled mud within the recycled mud reclamation tank.

25. The method of claim 24, each recirculation system further comprising at least one centrifuge adapted to filter out one or more undesirable compounds in the recycled mud and returning the recycled mud to the recycled mud reclamation tank.

26. The method of claim 25 further comprising at least one second spray system adapted to selectively dispense fluid adapted to neutralize or eliminate an undesirable compound in the recycled mud.

27. The method of claim 21 further including the step of introducing at least one centralized computer system in electronic communication with the clean mud mixing tank, the conveyor belt system, the recycled mud reclamation tank, and the recirculation system, the computer system adapted to selectively control any of the clean mud mixing tank, the conveyor belt system, the recycled mud reclamation tank, or the recirculation system.

28. The method of claim [21] *24* further including the step of utilizing a foundation adapted to retain and, during transport, carry the weight of the clean mud mixing tank, the conveyor belt system, the recycled mud reclamation tank, and the recirculation system.

29. The method of claim 21 further including the step of utilizing at least one fracture tank, each fracture tank adapted to receive, store and dispense recycled mud which may remain in either the clean mud tank or the recycled mud tank after the down hole well drilling process is completed.

30. A closed loop method for reclaiming drilling mud used in a down hole well drilling process with a drilling rig having a mud flow communication path containing drilling mud from at least one clean mud mixing tank, the method comprising the steps of:

transporting the drilling mud from the drilling rig to at least one dirty mud shaker, each dirty mud shaker adapted to receive dirty mud from the mud flow communication path, each shaker further adapted to partially separate undesired particles from the drilling mud resulting in shaker processed mud and used mud, each shaker further adapted to transport the used mud to the clean mud mixing tank and reintroducing the shaker processed mud back into the mud flow communication path;

transporting the shaker processed mud from the mud flow communication path to at least one recycled mud *reclamation* tank, the recycled mud tank further including at least one recirculation system in mud flow communication with the *at least one* recycled mud reclamation tank and the clean mud mixing tank, each recirculation system adapted to filtrate the shaker processed mud resulting in a recycled mud within the recycled mud reclamation tank and transport the recycled mud to the clean mud mixing tank for use as drilling mud.

31. A closed loop method for reclaiming drilling mud used in a down hole well drilling process with a drilling rig having a mud flow communication path containing drilling mud from a clean mud mixing tank, the method comprising the steps of:

transporting the drilling mud from the drilling rig to at least one recycled mud reclamation tank and transporting any cuttings to at least one cuttings disposal tank;

allowing at least one recirculation system within the recycled mud reclamation tank to filtrate the drilling mud resulting in a recycled mud; and transporting the recycled mud within the recycled mud reclamation tank to the drilling rig through the clean mud mixing tank.

32. The closed loop method for reclaiming drilling mud of claim 31, each recirculation system comprising at least one centrifuge system adapted to filter out one or more undesirable compounds in the recycled mud and returning the recycled mud to the recycled mud reclamation tank.

33. The closed loop method for reclaiming drilling mud of claim 32, each recirculation system further comprising at least a spray system adapted to selectively dispense fluid adapted to neutralize or eliminate an undesirable compound in the recycled mud.

34. A process for reclaiming drilling mud used in a down hole well drilling event with a drilling rig, the process comprising the steps of:

transporting the drilling mud from the drilling rig to at least one recycled mud reclamation tank resulting in recycled mud, the recycled mud reclamation tank being in mud flow communication with the drilling rig;

allowing at least one recirculation system within the recycled mud reclamation tank to filtrate the drilling mud resulting in a recycled mud; and transporting the recycled mud within the recycled mud reclamation tank to a clean mud mixing tank for use as drilling mud through one or more centrifuge systems, each centrifuge system adapted to selectively filtrate one or more undesired compounds prior to transmitting the recycled mud to the clean mud mixing tank, the clean mud mixing tank being in mud flow communication with the drilling rig.

35. The process of claim 34 further comprising the [steps] *step* of transporting the recycled mud to at least one conveyor belt system adapted to receive mud from the mud flow communication path and substantially separate undesired particles from the recycled mud.

36. The process of claim 34 further comprising the step of introducing clean mud into the clean mud mixing tank through at least one hopper.

37. The process of claim 34, each recirculation system further comprising at least a spray system adapted to selectively dispense fluid adapted to neutralize or eliminate an undesirable compound in the recycled mud.

38. A closed loop method for reclaiming drilling mud used in a down hole well drilling process with a drilling rig having a mud flow communication path containing drilling mud, the method comprising the steps of:

transporting the drilling mud from the drilling rig to at least one recycled mud reclamation tank, the mud reclamation tank being in mud flow communication with the drilling rig, the mud reclamation tank further comprising at least one recirculation system adapted to filtrate the drilling mud resulting in a recycled mud within the recycled mud reclamation tank; and transporting the recycled mud within the recycled mud reclamation tank to the drilling rig for use as drilling mud through one or more centrifuge systems, each centrifuge system adapted to selectively filtrate one or more undesired compounds prior to transmitting the recycled mud to the drilling rig through [the] *a* clean mud mixing tank.

39. The method of claim 38 wherein each recirculation system comprises at least one recycling centrifuge system, each recycling centrifuge system adapted to selectively filtrate one or more undesired compounds from the recycled mud in the recycled mud reclamation tank.

40. The method of claim 39, each recirculation system further comprising at least a spray system adapted to selectively dispense fluid adapted to neutralize or eliminate an undesirable compound in the recycled mud.

41. A closed loop apparatus for reclaiming drilling mud used in a down hole well drilling process with a drilling rig having drilling mud, the apparatus being in mud flow communication with the drilling rig forming a mud flow communication path, the apparatus comprising at least one mud reclamation tank and at least one centrifuge system, each mud reclamation tank being in mud flow communication with the drilling rig and the at least one centrifuge system, each mud reclamation tank accepts the drilling mud, filtrates the drilling mud through at least one recirculation system resulting in recycled mud and transports the recycled mud to the at least one centrifuge system, the at least one centrifuge system filters out one or more undesirable compounds in the recycled mud, and returns the recycled mud to the mud flow communication path.

42. The apparatus of claim 41, each mud reclamation tank further comprising at least a spray system adapted to selectively dispense fluid adapted to neutralize or eliminate an undesirable compound in the recycled mud.

43. The apparatus of claim 41, the at least one recirculation system further comprising at least one centrifuge adapted to filter out one or more undesirable compounds in the recycled mud and [returning] *return* the recycled mud to the recycled mud reclamation tank.

*44. An entirely closed loop apparatus for reclaiming dirty drilling mud used in a down hole well drilling process with a drilling rig generating the dirty drilling mud, the apparatus being in mud flow communication with the drilling rig defining a mud flow communication path, the apparatus comprising at least one mud reclamation tank and at least one centrifuge system, each mud reclamation tank being in mud flow communication with the drilling rig and the at least one centrifuge system, each mud reclamation tank adapted to receive and store the dirty drilling mud, each mud reclamation tank further comprising at least one recirculation system adapted to stir the dirty drilling mud and prevent undesired compounds in the dirty drilling mud from settling in the mud reclamation tank resulting in recirculated mud, the apparatus further adapted to transport the recirculated mud to the at least one centrifuge system, the at least one centrifuge system adapted to substantially or completely remove one or more undesirable compounds in the recirculated mud resulting in recycled mud, the at least one centrifuge system further adapted to return the recycled mud to the mud flow communication path.*

*45. The apparatus of claim 44, each recirculation system further comprising one or more pumps being in mud flow communication with each mud reclamation tank, each pump being adapted to assist in the movement of the dirty drilling mud within the mud reclamation tank.*

*46. The apparatus of claim 45 wherein each pump is a centrifugal pump.*

*47. The apparatus of claim 45 wherein each pump allows the dirty drilling mud to be transported out of each mud reclamation tank and then to be reinserted into the same mud reclamation tank after flowing through the pump.*

*48. The apparatus of claim 45, each recirculation system further comprising at least one first sprayer system positioned above the recirculated mud in each mud reclamation tank for spraying the recirculated mud in each mud reclamation tank during the movement of the recycled mud in each mud reclamation tank.*

*49. The apparatus of claim 44 further comprising one or more dirty mud shakers adapted to receive dirty drilling mud from the drilling rig and being in mud flow communication with a clean mud mixing tank and each mud reclamation tank, each dirty mud shaker being adapted to partially separate one or more undesired particles from the dirty drilling mud resulting in shaker processed mud and used mud, each shaker further adapted to transport the used mud to the clean mud mixing tank and reintroduce the shaker processed mud back into the mud flow communication path.*

*50. The apparatus of claim 44, each recirculation system further comprising one or more centrifugal pumps being in mud flow communication with each mud reclamation tank, each centrifugal pump being adapted to assist in the movement of the dirty drilling mud within the mud reclamation tank, the apparatus further comprising one or more dirty mud shakers adapted to receive dirty drilling mud from the drilling rig and being in mud flow communication with a clean mud mixing tank and each mud reclamation tank, each dirty mud shaker being adapted to partially separate one or more undesired particles from the dirty drilling mud resulting in shaker processed mud and used mud, each shaker further adapted to transport the used mud to the clean mud mixing tank and reintroduce the shaker processed mud back into the mud flow communication path.*

*51. A closed loop process for reclaiming dirty drilling mud generated from a down hole well drilling process with a drilling rig having a mud flow communication path containing drilling mud, the process comprising the steps of transporting the dirty drilling mud from the drilling rig to at least one recycled mud reclamation tank, each mud recla-*

*mation tank being in mud flow communication with the drilling rig and further comprising at least one recirculation system, using the recirculation system to stir the dirty drilling mud in each mud reclamation tank to prevent undesired compounds in the dirty drilling mud from settling within the mud reclamation tank resulting in recirculated mud, transporting the recirculated mud to at least one centrifuge system, the at least one centrifuge system adapted to filter out one or more undesirable particulates in the recirculated mud resulting in recycled mud, and transporting the recycled mud to the mud flow communication path.*

*52. The process of claim 51, each recirculation system further comprising one or more centrifugal pumps being in mud flow communication with each mud reclamation tank, each centrifugal pump assisting circulation of the dirty drilling mud in the mud reclamation tank to substantially or completely prevent the undesirable particulates in the dirty drilling mud from settling within each mud reclamation tank.*

*53. The process of claim 52, each recirculation system further comprising at least one sprayer system positioned above the recirculated mud in each mud reclamation tank for spraying the recirculated mud in each mud reclamation tank during the movement of the recycled mud in each mud reclamation tank.*

*54. A closed loop apparatus for reclaiming drilling mud used in a down hole well drilling process with a drilling rig having dirty drilling mud containing one or more undesirable particulates, the apparatus comprising at least one clean mud mixing tank adapted to mix and store drilling mud used in the down hole well drilling process, the clean mud mixing tank being in mud flow communication with the drilling rig through a predefined mud flow communication path, at least one mud reclamation tank in mud flow communication with the drilling rig, each mud reclamation tank adapted to receive the dirty drilling mud and variously circulate the dirty drilling mud in the mud reclamation tank through at least one recirculation system, each recirculation system adapted to selectively prevent undesired compounds in the dirty drilling mud from settling within the mud reclamation tank, resulting in recirculated mud, and at least one centrifuge in mud flow communication with each mud reclamation tank and each clean mud mixing tank, each centrifuge adapted to receive most, if not all, of the recirculated mud from the mud reclamation tank and selectively remove each undesirable particulates, resulting in recycled mud prior to transmitting the recycled mud to the clean mud mixing tank for use as clean mud in the down hole well drilling process.*

*55. The apparatus of claim 54, each recirculation system further comprising one or more centrifugal pumps being in mud flow communication with each mud reclamation tank, each centrifugal pump being adapted to assist the circulation of the dirty drilling mud in each mud reclamation tank to substantially or wholly prevent undesirable particulates in the dirty drilling mud from settling within each mud reclamation tank.*

*56. The apparatus of claim 54, each recirculation system further comprising at least one sprayer system positioned above the recirculated mud in each mud reclamation tank for spraying the recirculated mud in each mud reclamation tank during the movement of the recycled mud in each mud reclamation tank.*

* * * * *